(12) United States Patent
Yoshikawa

(10) Patent No.: US 7,600,937 B2
(45) Date of Patent: Oct. 13, 2009

(54) AQUEOUS GEL BALLPOINT PEN AND METHOD FOR THE PRODUCTION THEREOF

(75) Inventor: Masafumi Yoshikawa, Tokyo (JP)

(73) Assignee: Zebra Co., Ltd., Tokyo (JP)

( * ) Notice: Subject to any disclaimer, the term of this patent is extended or adjusted under 35 U.S.C. 154(b) by 0 days.

(21) Appl. No.: 12/271,646

(22) Filed: Nov. 14, 2008

(65) Prior Publication Data

US 2009/0129851 A1  May 21, 2009

(30) Foreign Application Priority Data

Nov. 16, 2007  (JP) ............................. 2007-298021

(51) Int. Cl.
*B43K 7/10*  (2006.01)

(52) U.S. Cl. ...................... 401/216; 401/209

(58) Field of Classification Search ................ 401/208, 401/209, 215, 216, 219
See application file for complete search history.

(56) References Cited

U.S. PATENT DOCUMENTS 5,609,432 A * 3/1997 Yamamoto et al. .......... 401/209

6,299,376 B1 * 10/2001 Nakatani ..................... 401/215
2007/0292200 A1 * 12/2007 Takasu ........................ 401/209

FOREIGN PATENT DOCUMENTS

| JP | 11-148043 | 6/1999 |
| JP | 2000-327982 A | 11/2000 |
| JP | 2004-59877 A | 2/2004 |

* cited by examiner

*Primary Examiner*—David J Walczak
(74) *Attorney, Agent, or Firm*—Morrison & Foerster LLP

(57) ABSTRACT

An aqueous gel ballpoint pen 1 having an ink-storage tube storing an aqueous gel ink containing a pigment as a coloring agent, and a ballpoint pen tip having a ball rotatably held at its leading end and also having an ink flow pore which is formed so that the aqueous gel ink flows from the ink-storage tube to the ball, wherein an ink flow pore diameter r (unit: mm) in the ballpoint pen tip and a storage modulus G' (unit: Pa) at 20° C. of the aqueous gel ink satisfy conditions represented by the following formulas (1) and (2):

$$0.24 \leq r \leq 0.64 \quad (1), \text{ and}$$

$$1.3 \leq G' \leq 16r - 3.2 \quad (2).$$

4 Claims, 2 Drawing Sheets

AQUEOUS GEL BALLPOINT PEN AND METHOD FOR THE PRODUCTION THEREOF

BACKGROUND OF THE INVENTION

1. Field of the Invention

The present invention relates to an aqueous gel ballpoint pen and a method for production thereof.

2. Related Background Art

In an aqueous gel ballpoint pen, usually, the water of an ink contained in the inside of an ink-storage tube and the inside of a ballpoint pen tip vaporizes in accordance with lapse of time to increase the viscosity of the ink and hence reduce the fluidity thereof. Therefore, when an aqueous gel ballpoint pen is left at rest for a long period of time, the ink causes clogging in the inside of the ballpoint pen tip to lower the property of writing with the reduction of fluidity. In short, the conventional aqueous gel ballpoint pens should be further improved in their storage stabilities.

Thus, concerning water base ballpoint pens, various studies have been conducted on the composition of an ink from the standpoint of fluidity and proposals for increasing the storage stability have been made (See Japanese Patent Application Laid-Open No. 2004-59877, Japanese Patent Application Laid-Open No. 2000-327982, Japanese Patent Application Laid-Open No. 11-148043, etc.). For example, in order to provide an aqueous ink for a ballpoint pen with excellent stability over time, which does not form aggregates of a pigment even after lapse of a long period of time, there has been proposed an aqueous ink for a ballpoint pen which contains xanthan gum and a noncrosslinked polyacrylic acid having a predetermined molecular weight and the like (See Japanese Patent Application Laid-Open No. 2004-59877).

SUMMARY OF THE INVENTION

As a ballpoint pen tip, an arrow type ballpoint pen tip and a needle type ballpoint pen tip are known in terms of its shape. In the needle type ballpoint pen tip of these, it is impossible to increase the diameter of an ink flow pore as an ink flow channel for feeding an ink to a ball due to the restriction of its shape. Accordingly, as compared with an aqueous gel ballpoint pen having an arrow type ballpoint pen tip, an aqueous gel ballpoint pen having a needle type ballpoint pen tip has a small diameter of the ink flow pore in the tip, and hence is readily affected by influence to the above-mentioned fluidity reduction of ink and hardly has good storage stability.

However, the conventional water base ballpoint pens such as those disclosed in the above patent documents (Japanese Patent Application Laid-Open No. 2004-59877, Japanese Patent Application Laid-Open No. 2000-327982, Japanese Patent Application Laid-Open No. 11-148043) have an arrow type ballpoint pen tip as a prerequisite. Therefore, even if the conventional aqueous gel inks are adopted for water base ballpoint pens having a needle type ballpoint pen tip, it is difficult to secure sufficient storage-stability.

The present invention has been accomplished in view of the above situations, and aims at providing an aqueous gel ballpoint pen having sufficiently enhanced storage stability of ink particularly when a needle type ballpoint pen tip is adopted, and a method for production thereof.

The present inventors have devoted themselves to buildup of studies in order to attain the above aim, and accordingly have found that the storage stability of an aqueous gel ballpoint pen using a tip having a small ink flow pore diameter as in a needle type ballpoint pen tip can be enhanced by controlling the storage modulus of ink, and have led to accomplishment of the present invention.

That is, the present invention provides an aqueous gel ballpoint pen comprising an ink-storage tube storing an aqueous gel ink containing a pigment as a coloring agent, and a ballpoint pen tip having a ball rotatably held at its leading end and also having an ink flow pore which is formed so that the aqueous gel ink flows from the ink-storage tube to the ball, wherein an ink flow pore diameter r (unit: mm) in the ballpoint pen tip and a storage modulus G' (unit: Pa) at 20° C. of the aqueous gel ink satisfy conditions represented by the following formulas (1) and (2):

$$0.24 \leq r \leq 0.64 \quad (1), \text{ and}$$

$$1.3 \leq G' \leq 16r - 3.2 \quad (2).$$

Such an aqueous gel ballpoint pen can be produced by a method for producing an aqueous gel ballpoint pen comprising an ink-storage tube storing an aqueous gel ink containing a pigment as a coloring agent, and a ballpoint pen tip having a ball rotatably held at its leading end and also having an ink flow pore which is formed so that the aqueous gel ink flows from the ink-storage tube to the ball, wherein the method comprises a step of preparing the aqueous gel ink so that an ink flow pore diameter r (unit: mm) in the ballpoint pen tip and a storage modulus G' (unit: Pa) at 20° C. of the aqueous gel ink satisfy conditions represented by the above formulas (1) and (2).

Also, the present invention provides an aqueous gel ballpoint pen comprising an ink-storage tube storing an aqueous gel ink containing only a dye as a coloring agent, and a ballpoint pen tip having a ball rotatably held at its leading end and also having an ink flow pore which is formed so that the aqueous gel ink flows from the ink-storage tube to the ball, wherein an ink flow pore diameter r (unit: mm) in the ballpoint pen tip and a storage modulus G' (unit: Pa) at 20° C. of the aqueous gel ink satisfy conditions represented by the following formulas (3) and (4):

$$0.24 \leq r \leq 0.64 \quad (3), \text{ and}$$

$$0 < G' \leq 16r - 3.2 \quad (4).$$

Such an aqueous gel ballpoint pen can be produced by a method for producing an aqueous gel ballpoint pen comprising an ink-storage tube storing an aqueous gel ink containing only a dye as a coloring agent, and a ballpoint pen tip having a ball rotatably held at its leading end and also having an ink flow pore which is formed so that the aqueous gel ink flows from the ink-storage tube to the ball, wherein the method comprises a step of preparing the aqueous gel ink so that an ink flow pore diameter r (unit: mm) in the ballpoint pen tip and a storage modulus G' (unit: Pa) at 20° C. of the aqueous gel ink satisfy conditions represented by the above formulas (3) and (4).

Herein, "storage modulus G'" in the present invention is measured by the dynamic viscoelasticity measuring method using a cone plate of 25 mm radius and 2° cone angle at a measuring temperature of 20° C. under the conditions of strain $\gamma = 2\%$ and angular frequency $\omega = 0.1 \text{ s}^{-1}$.

The reasons why the present invention can provide an aqueous gel ballpoint pen having sufficiently enhanced storage stability of ink particularly when a needle type ballpoint pen tip having a small ink flow pore diameter is adopted have not been clarified in detail until now. However, the present inventors presume that there would be the following reasons, to which the reasons are not limited.

That is, the present inventors believe that the reduction in the writing performance of a ballpoint pen after an aqueous gel ink is left at rest for a long period of time is due to evaporation of water in the ink. Because of this evaporation of water, the interactions among the respective components such as a coloring agent remaining in the ink become large, and the ink becomes structurally strong. Therefore, when the ink flow pore diameter in a tip is small, it becomes difficult for the ink to pass through the ink flow pore, and hence the writing performance is reduced. The structural strength of the ink is influenced by its storage modulus more strongly than by its viscosity, and hence it is presumed that it would be possible to keep the storage stability of the aqueous gel ink sufficiently excellent by controlling its storage modulus.

Further, when an aqueous gel ink contains a pigment, adjustment of its storage modulus at a value not less than a predetermined value prevents the sedimentation or localization of the pigment even after the aqueous gel ink is left at rest for a long period of time, and hence the density change of a written line based on the change in pigment concentration is hardly produced.

In addition, when an ink flow pore diameter is more than 0.64 mm or less than 0.24 mm, the storage stability of an aqueous gel ink tends to hardly depend on its storage modulus. This is considered to be because when an ink flow pore is diameter more than 0.64 mm, the inside diameter of the ink flow pore is so large that no particular problems occur in passing of the ink through the ink flow pore. Further, this is considered to be because when an ink flow pore diameter is less than 0.24 mm, problems occur in the ink fluidity after storage, irrespective of its storage modulus.

DESCRIPTION OF THE PREFERRED EMBODIMENTS

Figure 1:
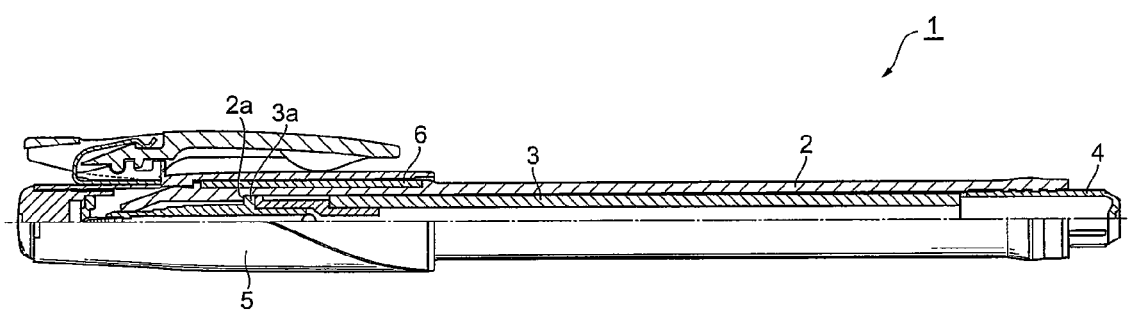
FIG. 1 is a sectional view showing the ballpoint pen provided with a needle type ballpoint pen tip according to the present invention.

Hereinafter, the preferred embodiments of the present invention will be explained in detail, referring to the drawings as necessary. In this connection, in the drawings, the same symbols are given to the same elements, and an overlapping explanation will be omitted. Furthermore, the dimension ratios in the drawings are not limited to the ratios actually shown in the drawings. In addition, the following explanations are given referring to pen point side as "fore side".

FIG. 1 shows the schematic section of the aqueous gel ballpoint pen according to a preferred embodiment of the present invention. This aqueous gel ballpoint pen 1 belongs to the cap type, and is constituted by a cylindrical barrel 2 formed of a transparent resin, a refill 3 loaded within the barrel 2, a tail stopper 4 made of a resin fixed at the rear end of the barrel 2, a cap 5 acting as a cover for the leading end of the barrel 2, and a non-slip grip 6 made of a rubber fixed at the fore side of the outer periphery of the barrel 2.

Figure 2:
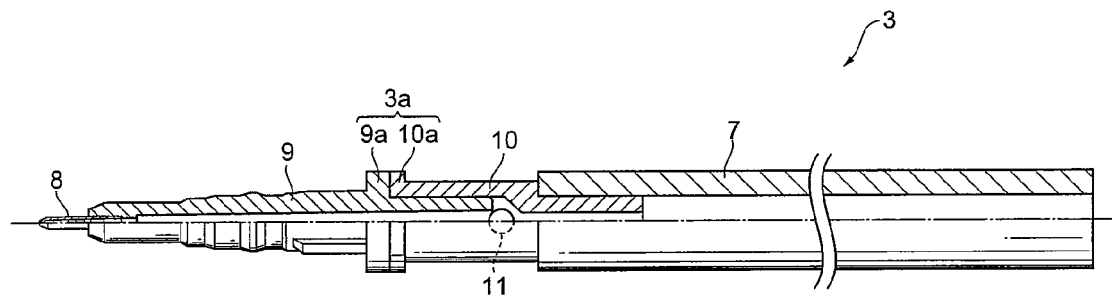
FIG. 2 is a sectional view showing the refill provided with a needle type ballpoint pen tip at its leading end according to the present invention.

FIG. 2 is a schematic section showing the above refill 3 in more detail. The refill 3 has an ink-storage tube 7 filled with an aqueous gel ink, a joint 9 made of a transparent resin having a needle type ballpoint pen tip 8 fixed at its leading end, a joint tail plug 10 connecting the leading end side of the ink-storage tube 7 and the rear end side of the joint 9, and a ball valve 11 closing the rear end opening of the joint 9 to prevent the back flow of the ink. The refill 3 is fixed in the barrel 2 by inserting the refill 3 into the hollow portion of the barrel 2 from the rear end thereof, and contacting a flange 3a provided at the fore side of the refill 3 with a stage portion 2a within the barrel 2, and then fastening the tail stopper 4 (See FIG. 1). In this connection, the flange 3a is formed by the butting and bonding of a flange 9a of the joint 9 and a flange 10a of the joint tail plug 10.

Figure 3:
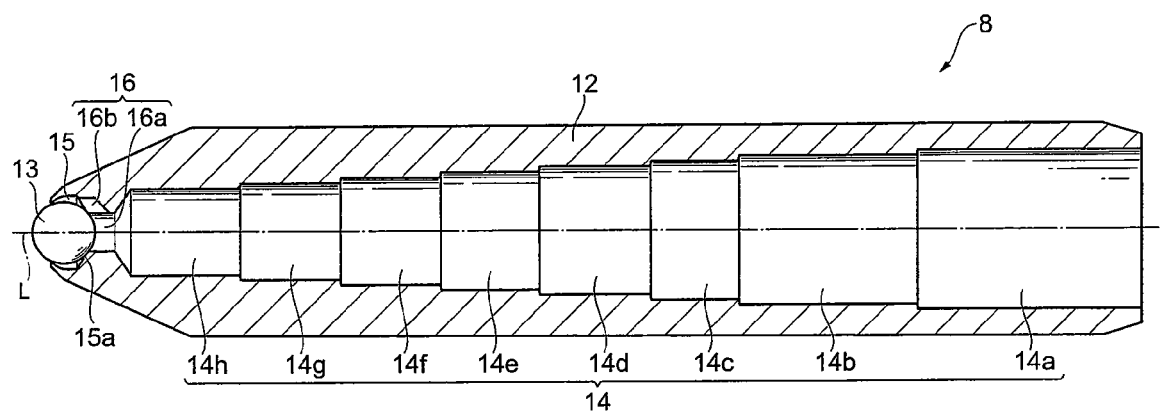
FIG. 3 is a sectional view showing an embodiment of the needle type ballpoint pen tip according to the present invention.

FIG. 3 is a schematic section showing the above needle type ballpoint pen tip 8 in more detail. The needle type ballpoint pen tip 8 has a tip body 12 made of a metal (for example, stainless steel SF20T) and a ball 13 having a diameter of 0.3 or 0.4 mm loaded at the leading end of the tip body 12. The whole length of the tip body 12 is about 5 mm and the diameter thereof is not more than about 1 mm, and in the tip body 12 there is provided an ink flow pore 14 extending along the central longitudinal axis L.

This needle type ballpoint pen tip 8 is not an arrow type ballpoint pen tip like an arrow-head, and has an elongate shape like a needle. The needle type ballpoint pen tip 8 has a very small diameter. Particularly, when the diameter is not more than 1 mm, naturally the diameter of the ball 13 and that of the ink flow pore 14 are also small. In order to realize smooth writing touch, it is necessary to make the displacement between the central longitudinal axis of the ink flow pore 14 and the center of the ball 13 as small as possible.

Thus, without using a pipe material as a base material, this ink flow pore 14 is shaped by drill-cutting of a cylindrical steel material having a solid metal (for example, stainless steel SF20T) having a diameter of not more than about 1 mm. In addition, this ink flow pore 14 has 8 cylindrical pore portions 14a to 14h, and the diameter of each of the pore portions 14a to 14h is smaller by 0.02 mm than the next portion respectively in the direction from the rear end to the leading end of the tip body 12.

When a solid steel material is cut with a drill, a drill having a small diameter must be used, because the diameter of the ink flow pore 14 is small. Therefore, in consideration of the cracking or deformation of a drill, the ink flow pore 14 is not shaped by drilling once, but shaped by drilling twice or more (8 times in the present embodiment). In this case, when the ink flow pore 14 is shaped with drills having the same diameter, the cutting blade of the subsequent drill rubs the wall surface of the drill pore formed by the previous drill at a high speed. Accordingly, there are caused the problems that the lifetime of a drill is extremely shortened and a drill becomes apt to crack. Thus, drill-cutting is divided into 8 steps, and diameters of drills are shortened stepwise to conduct drill-cuttings, and the ink flow pore 14 has plural (8) cylindrical pore portions 14a to 14h having different diameters as the result of such drill-cuttings.

Furthermore, the adjacent pore portions 14a to 14h have even diameter difference, and the diameter difference of the pore portions 14a to 14h is about 0.02 mm, and hence the finished internal wall surface of the ink flow pore 14 can be made smooth as compared with the case of the diameter difference of about 0.01 mm and the case of no diameter difference. This allows stable flow of ink in the ink flow pore 14 and contributes to smooth writing touch. Moreover, this can increase cutting efficiency while lengthening the lifetime of a drill.

Furthermore, at the leading end side of the ballpoint pen tip 8, there is provided a ball-storing space portion 15 shaped by drill-cutting, and the ball-storing space portion 15 is connected to the frontmost pore portion 14h through an ink flow-controlling portion 16 shaped by drill-cutting. This ink flow-controlling portion 16 has a cylindrical center pore 16a forming main stream and shaped by drill-cutting and branch grooves 16b projecting radially from the center pore 16a and shaped at an equal interval in the circumferential direction of the center pore 16a.

In addition, the ball 13 is loaded in the drill pore shaped after drilling the leading end of a steel material, and rotatably held in the ball-storing space portion 15 by the subsequent compaction step of the leading end. In this case, the bottom portion of the ball-storing space portion 15 shaped by drill-cutting is used as a seating face 15a of the ball 13, and this seating face 15a uses the face formed by drill-cutting and hence has high accuracy as compared with the conventional seating face (See, for example, Japanese Patent Application Laid-Open No. 2006-62175) shaped by punching from the outside of a pipe material. Therefore, this fact enhances the rotation accuracy of the ball 13 and also contributes to smooth writing touch.

Specifically, in the above-mentioned ballpoint pen tip 8, the diameter of the tip body 12 is about 0.8 mm and the length thereof is about 5 mm, and when the diameter of the ball 13 is 0.3 mm, the diameter of the pore portion 14a is 0.56 mm, the diameter of the pore portion 14b is 0.54 mm, the diameter of the pore portion 14c is 0.52 mm, the diameter of the pore portion 14d is 0.50 mm, the diameter of the pore portion 14e is 0.48 mm, the diameter of the pore portion 14f is 0.46 mm, the diameter of the pore portion 14g is 0.44 mm, the diameter of the pore portion 14h is 0.42 mm, and the diameter of the center pore 16a is 0.17 mm. In addition, when the diameter of the ball 13 is 0.4 mm, the diameter of the center pore 16a is 0.25 mm. Such dimensions realize smooth writing touch.

The aqueous gel ink filled in the ink-storage tube 7 contains a coloring agent such as a pigment and/or a dye, ion-exchange water, and a gelling agent.

As the coloring agent, there can be used the coloring agents which are used in usual aqueous gel inks for a ballpoint pen. For example, water-soluble dyes such as direct dyes, acid dyes, and basic dyes, and water-dispersible pigments such as organic pigments and inorganic pigments can be used singly or in combination of two or more.

As the direct dye, indicated by color index number, direct dyes such as Color Index (hereinafter referred to as C. I.) Direct Black 17, the same 19, the same 38, the same 154, C. I. Direct Yellow 1, the same 4, the same 12, the same 29, C. I. Direct Orange 6, the same 8, the same 26, the same 29, C. I. Direct Red 1, the same 2, the same 4, the same 13, C. I. Direct Blue 2, the same 6, the same 15, the same 78, the same 87 and the like can be used.

As the acid dye, C. I. Acid Black 2, the same 31, C. I. Acid Yellow 3, the same 17, the same 23, the same 73, C. I. Acid Orange 10, C. I. Acid Red 13, the same 14, the same 18, the same 27, the same 52, the same 73, the same 87, the same 92, C. I. Acid Blue 1, the same 9, the same 74, the same 90, and the like can be used.

As the basic dye, C. I. Basic Yellow 2, the same 3, C. I. Basic Red 1, the same 2, the same 8, the same 12, C. I. Basic Violet 1, the same 3, the same 10, C. I. Basic Blue 5, the same 9, the same 26, and the like can be used.

As the water-dispersible pigment, all of the pigments that are dispersible in an aqueous medium can be used, for example, inorganic pigments such as carbon black, metal powder pigments, and the like; organic pigments such as azo type, phthalocyanine type, quinacridone type, and the like; fluorescent pigments; and the like can be used.

The gelling agent is not particularly limited, so long as it is the gelling agent adopted in usual aqueous gel inks for a ballpoint pen. Examples of the gelling agent include, for example, natural types such as xanthan gum, guar gum, locust bean gum, carrageenan, gum arabic, gum tragacanth, alginic acid, gelatine, agar, casein, psyllium seed gum, and tamarind seed gum; synthetic types such as methyl cellulose, ethyl cellulose, hydroxyethyl cellulose, carboxymethyl cellulose, sodium carboxymethyl cellulose, sodium alginate, polyvinyl pyrrolidone, polyvinyl alcohol, polyvinyl methyl ether, sodium polyacrylate, and carboxyvinyl polymer; and the like. They can be used singly or in combination of two or more.

When only the pigment is contained as the coloring agent, the proportion of the coloring agent contained in the gel ink is preferably 2 to 30 mass %, more preferably 3 to 20 mass %. When the proportion of the coloring agent contained is less than the above lower limit value, the written line tends to be hardly visible, and when the proportion exceeds the above upper limit value, the abrasion of the tip tends to become remarkable, leading abnormalities in writing.

In addition, when only the dye is contained as the coloring agent, the proportion of the coloring agent contained in the gel ink is preferably 2 to 20 mass %, more preferably 3 to 15 mass %. When the proportion of the coloring agent contained is less than the above lower limit value, the written line tends to be hardly visible, and when the proportion exceeds the above upper limit value, the dye tends to cause deposition at the tip portion.

When the pigment and the dye are contained as the coloring agent, the proportions of the pigment and the dye contained in the gel ink are preferably 1 to 30 mass % and 1.5 to 15 mass %, respectively. When the proportions of the coloring agents contained are less than the above lower limit values, the written line tends to be hardly visible. On the other hand, when the proportions exceed the above upper limit values, the abrasion of the tip tends to become remarkable, leading abnormalities in writing, and the dye tends to be apt to cause deposition at the tip portion.

In addition, the proportion of the gelling agent contained in the gel ink is preferably 0.01 to 5 mass %, more preferably 0.1 to 2 mass %. When the proportion of the gelling agent contained is less than the above lower limit value, the pigment becomes apt to settle down, and refilling tends to be difficult. On the other hand, when the proportion exceeds the above upper limit value, problems arise in fluidity and writing tends to be impossible.

In the aqueous gel ink for a ballpoint pen according to the present invention, as necessary, it is also possible to simultaneously use other additives such as humectant, preservative, water-soluble organic solvent, rust inhibitor, mildewproofing agent, dye-dissolving assistant, pH adjuster, fixing resin, surface tension adjuster, and the like. As these additives, usual commercial products can be used. In addition, it is preferable to use a dispersing assistant at the same time. As the dispersing assistant, there can be preferably used fluorine-containing surface active agents such as F-477 and F-479 (both, trade names) manufactured by DAINIPPON INK & CHEMICALS, INC., and Surflon S-386 and S-393 (both, trade names) manufactured by AGC SEIMI CHEMICAL CO., LTD., and the like.

In the aqueous gel ink for a ballpoint pen according to the present invention, in the case of containing as a coloring agent a pigment and furthermore a dye, its storage modulus G' at 20° C. satisfies the condition represented by the above-mentioned formula (2). In addition, in the case of containing as a coloring agent only a dye, its storage modulus G' satisfies the condition represented by the above-mentioned formula (4).

Herein, the ink flow pore diameter in the ballpoint pen tip 8 is an average pore diameter, namely, a value derived from the formula, $\{\Sigma(r_n \times l_n)/\Sigma l_n\}$, wherein $r_n$ means the pore diameter of each of the pore portions in the ink flow pore 14 and $l_n$ means the length of each pore portion.

When the storage modulus G' does not satisfy these formulas, pigment particles become apt to settle down or localize, and hence writing after leaving the aqueous gel ballpoint pen 1 at rest for a long period of time makes the density change of the written line remarkable. Alternatively, the discharge condition of the gel ink becomes not good, and thin spots are produced in the written line or writing becomes impossible, and hence the storage stability of the aqueous gel ballpoint pen 1 is reduced.

In addition, when the ink flow pore diameter r does not satisfy the above-mentioned formulas (1) and (3), that is, when r is more than 0.64 mm or less than 0.24 mm, the storage stability of the aqueous gel ink tends to hardly depend on the storage modulus.

In producing the aqueous gel ballpoint pen of the present invention, by providing a step of preparing the aqueous gel ink so intentionally that the ink flow pore diameter r in the ballpoint pen tip 8 and the storage modulus G' of the aqueous gel ink satisfy the conditions represented by the above-mentioned formulas (1) and (2) or formulas (3) and (4), the effects due to the present invention can be produced surely.

The storage modulus of the aqueous gel ink can be controlled by the following methods. First, the storage modulus of the aqueous gel ink can be controlled by adjusting the kind and content of a gelling agent. Furthermore, when the aqueous gel ink contains a humectant, the storage modulus of the aqueous gel ink can be controlled by adjusting the content of the humectant. These methods change the state of a solvent in the aqueous gel ink, and hence are factors having influence on not only the storage modulus but also the viscosity of the aqueous gel ink.

Moreover, when the aqueous gel ink contains a pigment, the storage modulus of the aqueous gel ink can be controlled by adjusting the dispersion state thereof based on the content of a dispersing assistant. Furthermore, the storage modulus of the aqueous gel ink can be controlled by adjusting the kind and content of a pigment. These methods exert influence on the agglomeration state of pigment particles, and hence are considered to have remarkable influence on the storage modulus as compared with the viscosity of the aqueous gel ink.

In the aqueous gel ballpoint pen 1 of the present embodiment, the ink flow pore diameter in the ballpoint pen tip 8 is small, and hence it is presumed that in accordance with the evaporation of water in the ink after leaving the ballpoint pen at rest for a long period of time the interactions among the components such as a coloring agent remaining in the ink become large, and the ink hardly flows through the ink flow pore 14, and consequently writing performance is deteriorated. The structural strength of the ink, which is considered to be the cause, is affected by its storage modulus more strongly than by its viscosity, and hence the present inventors presume that the storage stability of a ballpoint pen using the aqueous gel ink can be made sufficiently excellent by controlling its storage modulus.

Further, when an aqueous gel ink contains a pigment, adjustment of its storage modulus at a value not less than a predetermined value prevents the sedimentation or localization of the pigment even after the aqueous gel ink is left at rest for a long period of time, and hence the density change of a written line based on the change in pigment concentration is hardly produced.

Hereinbefore, the preferred embodiments of the present invention have been explained, but the present invention is not limited to the above embodiments. In the present invention, various modifications are possible in the scope not deviating from its gist. For example, adjacent pore portions 14a to 14h need not have even diameter difference, and the number of pore portions is not limited to 8.

Furthermore, in the aqueous gel ballpoint pen of the present invention, its ballpoint pen tip may be not only a needle type ballpoint pen tip but also an arrow type ballpoint pen tip, so long as the ink flow pore diameter satisfies the above conditions.

EXAMPLES

Hereinafter, the present invention will be explained in more detail by way of examples, but the present invention is not limited to these examples.

[Production of Aqueous Gel Ballpoint Pens]

Production Examples 1 to 34

First, each member of an aqueous gel ballpoint pen except an aqueous gel ink was prepared. A needle type ballpoint pen tip (average ink flow pore diameter: 0.50 mm) having a shape similar to that shown in FIG. 2 and a needle type ballpoint pen tip (ink flow pore diameter: 0.24 mm) in which the ink flow pores has the same diameter in the longitudinal direction were prepared, respectively.

Next, the materials shown in Tables 1 to 3 were mixed and agitated to obtain an aqueous gel ink. In this procedure, when the aqueous gel ink contained a pigment (Production Examples 1 to 30), the mixing proportion of each material was adjusted so that the storage modulus G' satisfied or did not satisfy the above-mentioned formula (2). In addition, when the aqueous gel ink contained only a dye as a coloring agent (Production Examples 31 to 34), the mixing proportion of each material was adjusted so that the storage modulus G' satisfied the above-mentioned formula (4). The mixing proportion (mass part) of each material except ion-exchange water, and the storage modulus G' at 20° C. and the viscosity at 25° C. of the aqueous gel ink are shown in Tables 1 to 3. Herein, the storage modulus G' was measured by the dynamic viscoelasticity measuring method by use of a commercially available measuring apparatus, PHYSICA US200 (manufactured by Paar physica GmBH, trade name) and a cone plate (trade name: MK23) of 25 mm radius and 2° cone angle under the conditions of strain $\gamma=2\%$ and angular frequency $\omega=0.1$ $s^{-1}$. In addition, viscosity was measured by use of a commercially available measuring apparatus, VISCOMETER TV-33 (manufactured by TOKI SANGYO CO., LTD., trade name) and a cone plate (trade name: 0.8°×R24) of 24 mm radius and 0.8° cone angle under the condition of number of revolutions=0.1 rpm. In addition, in Tables 1 to 3, the mixing proportion of each material is shown in mass part, and these materials were mixed with ion-exchange water to form 100 mass parts.

In addition, among the respective materials of the gel ink shown in Tables 1 to 3, as a dispersion of a pigment in water, there were used WA-Z COLOR BLACK (manufactured by DAINICHISEIKA COLOUR & CHEMICALS MFG. CO., LTD., trade name, pigment 16 mass %), WA-Z COLOR GREEN (manufactured by DAINICHISEIKA COLOUR & CHEMICALS MFG. CO., LTD., trade name, pigment 20 mass %), WA-Z COLOR YELLOWISH GREEN, WA-Z COLOR BLUE BLACK (the two: manufactured by DAINICHISEIKA COLOUR & CHEMICALS MFG. CO., LTD., trade names, pigment 8 mass %), FUJI SP ORANGE, FUJI SP RED (the two: manufactured by Fuji Pigment Co., Ltd., trade names, pigment 17 mass %), FUJI SP BLUE (manufactured by Fuji Pigment Co., Ltd., trade name, pigment 12 mass %), BONJET BLACK (manufactured by Orient Chemical Industries, Ltd., trade name, pigment 16 mass %), and LUMIKOL NKW-6200E (manufactured by Nippon Keiko Kagaku Ltd., trade name, pigment 50 mass %).

In addition, as a solution of a dye in water, there were used WATER BLACK 191-L (manufactured by Orient Chemical Industries, Ltd., trade name, 15% solution), DAIWA BLACK MR (manufactured by DAIWA KASEI KOGYO CO., LTD., trade name, 13% solution), and DAIWA BLUE 300L (manufactured by DAIWA KASEI KOGYO CO., LTD., trade name, 13% solution).

In addition, as humectants, commercially available glycerine, ethylene glycol, diethylene glycol, and propylene glycol were used in proper combination. Commercially available 5% benzotriazole solution as a rust inhibitor, commercially available 10% benzisothiazolone solution as a preservative, and commercially available potassium oleate, polyoxyethylene lauryl amine, and oleic acid PEG-5 glyceryl as a surface active agent were used in proper combination. As a dispersing assistant, there was used a fluorine-containing surface active agent which is commercially available usually.

Thereafter, the resultant aqueous gel ink was charged in an ink-storage tube, and then an aqueous gel ballpoint pen was produced from the respective members.

[Evaluation of Storage Stability]

The resultant aqueous gel ballpoint pen was left at rest for two months under the atmospheric circumstance at 60° C.

<Presence or Absence of Thin Spots in Written Line>

When writing was conducted by use of the aqueous gel ballpoint pen after left at rest, the case where the written line could be confirmed visually as written was evaluated as "A", the case where some thin spots were found but the written line could be confirmed was evaluated as "B", and the case where thin spots were remarkable and the written line was not recognizable approximately was evaluated as "C". The results are shown in Tables 1 to 3.

<Presence or Absence of Concentration Difference in Written Lines>

When the aqueous gel ballpoint pen after left at rest was used, with regard to the concentration difference in the written lines between the case where writing was conducted while holding the ballpoint pen tip side cast down and the case where writing was conducted while holding the ballpoint pen tip side cocked up, the case where the concentration difference was not produced was evaluated as "A", and the case where the concentration difference was produced was evaluated as "B". The results are shown in Tables 1 to 3.

TABLE 1

| Production Example | | 1 | 2 | 3 | 4 | 5 | 6 | 7 | 8 | 9 | 10 | 11 | 12 |
|---|---|---|---|---|---|---|---|---|---|---|---|---|---|
| Ink flow pore diameter | (mm) | 0.5 | 0.24 | 0.5 | 0.24 | 0.5 | 0.24 | 0.5 | 0.24 | 0.5 | 0.24 | 0.5 | 0.24 |
| Pigment/water dispersion (parts by mass) | WA-Z COLOR BLACK | | | | | 40 | | 40 | | 40 | | 40 | |
| | FUJI SP ORANGE | | | | | | | | | | | 30 | — |
| | WA-Z COLOR YELLOWISH GREEN | | | | | — | | — | | — | | — | 62.3 |
| | WA-Z COLOR BLUE BLACK | | | | | — | | — | | — | | — | — | — |
| | FUJI SP RED | | | | | — | | — | | — | | — | — | — |
| | WA-Z COLOR GREEN | | | | | — | | — | | — | | — | — | — |
| | BONJET BLACK | | | | | — | | — | | — | | — | — | — |
| | FUJI SP BLUE | | | | | — | | — | | — | | — | — | — |
| | LUMIKOL NKW-6200E | | | | | — | | — | | — | | — | — | — |
| Dye/water solution (parts by mass) | WATER BK 191-L | | | | | 20 | | 20 | | 20 | | 20 | — | — |
| | DAIWA BK MR | | | | | — | | — | | — | | — | — | — |
| | DAIWA BL 300L | | | | | — | | — | | — | | — | — | — |
| Humectant (parts by mass) | Glycerine | | | | | — | | — | | — | | — | — | — |
| | Ethylene glycol | | | | | 10 | | 10 | | 10 | | 10 | — | — |
| | Diethylene glycol | | | | | 15 | | 15 | | 15 | | 15 | — | — |
| | Propylene glycol | | | | | — | | — | | — | | — | 20 | 15 |
| Rust inhibitor (parts by mass) | 5% Benzotriazole solution | | | | | 1.5 | | 1.5 | | 1.5 | | 1.5 | 1.8 | 1.8 |
| Preservative (parts by mass) | 10% Benzisothiazolone solution | | | | | 0.5 | | 0.5 | | 0.5 | | 0.5 | 0.5 | 0.5 |
| Surface active agent (parts by mass) | | | | | | 1.1 | | 1.1 | | 0.9 | | 0.9 | 3.6 | 3 |
| pH Adjuster (parts by mass) | Triethanolamine | | | | | 1 | | 1 | | 1 | | 1 | 0.5 | 0.5 |
| Gelling agent (parts by mass) | Xanthan gum | | | | | 0.4 | | 0.38 | | 0.34 | | 0.32 | 0.4 | 0.4 |
| Dispersing assistant (parts by mass) | Fluorine-containing surface active agent | | | | | 0.7 | | 0.7 | | 0.7 | | 0.7 | 0.5 | 1 |
| Storage modulus G' | (Pa) | | | | | 4.44 | | 4.43 | | 2.51 | | 2.58 | 1.92 | 1.43 |
| Viscosity | (mPa·s) | | | | | 3952 | | 3197 | | 2681 | | 2739 | 3530 | 2668 |

TABLE 1-continued

| Production Example | | 1 | 2 | 3 | 4 | 5 | 6 | 7 | 8 | 9 | 10 | 11 | 12 |
|---|---|---|---|---|---|---|---|---|---|---|---|---|---|
| Storage stability evaluation | Thin spots in written line | B | C | B | C | A | C | A | C | A | C | A | C |
| | Concentration difference in written lines | A | A | A | A | A | A | A | A | A | A | A | A |

In the Table, "—" means absence.

TABLE 2

| Production Example | | 13 | 14 | 15 | 16 | 17 | 18 | 19 | 20 | 21 | 22 | 23 | 24 |
|---|---|---|---|---|---|---|---|---|---|---|---|---|---|
| Ink flow pore diameter | (mm) | 0.5 | 0.24 | 0.5 | 0.24 | 0.5 | 0.24 | 0.5 | 0.24 | 0.5 | 0.24 | 0.5 | 0.24 |
| Pigment/water dispersion (parts by mass) | WA-Z COLOR BLACK | — | | — | | — | | — | | — | | — | |
| | FUJI SP ORANGE | — | | — | | — | | — | | — | | — | |
| | WA-Z COLOR YELLOWISH GREEN | — | | — | | — | | — | | — | | — | |
| | WA-Z COLOR BLUE BLACK | 60 | | — | | — | | — | | — | | — | |
| | FUJI SP RED | | | 35 | | — | | — | | — | | — | |
| | WA-Z COLOR GREEN | — | | — | | 24.5 | | — | | — | | — | |
| | BONJET BLACK | — | | — | | — | | — | | — | | 16 | 16 |
| | FUJI SP BLUE | — | | — | | — | | 40 | | 20 | | — | |
| | LUMKOL NKW-6200E | — | | — | | — | | — | | — | | — | |
| Dye/water solution (parts by mass) | WATER BK 191-L | — | | — | | — | | — | | — | | | 20 |
| | DAIWA BK MR | — | | — | | — | | — | | — | | — | |
| | DAIWA BL 300L | — | | — | | — | | — | | — | | — | |
| Humectant (parts by mass) | Glycerine | — | | — | | — | | 5 | | 17.2 | | 17.2 | |
| | Ethylene glycol | — | | — | | — | | — | | — | | — | |
| | Diethylene glycol | — | | — | | — | | — | | — | | — | |
| | Propylene glycol | 15 | | 12 | | 15 | | 10 | | — | | — | |
| Rust inhibitor (parts by mass) | 5% Benzotriazole solution | 1.8 | | 1.8 | | 1.5 | | 2 | | 1.5 | | 1.5 | |
| Preservative (parts by mass) | 10% Benzisothiazolone solution | 0.5 | | 0.5 | | 0.5 | | 0.5 | | 0.5 | | 0.5 | |
| Surface active agent (parts by mass) | | 0.5 | | 3.6 | | 3.3 | | 3.1 | | 0.6 | | 1.1 | |
| pH Adjuster (parts by mass) | Triethanolamine | 0.5 | | 0.5 | | — | | 0.5 | | 1 | | 1 | |
| Gelling agent (parts by mass) | Xanthan gum | 0.35 | | 0.36 | | 0.52 | | 0.38 | | 0.38 | | 0.34 | |
| Dispersing assistant (parts by mass) | Fluorine-containing surface active agent | 1 | | 0.5 | | 0.8 | | 0.5 | | 0.7 | | 0.7 | |
| Storage modulus G' | (Pa) | 2.08 | | 2.34 | | 2.41 | | 3.57 | | 1.13 | | 0.82 | |
| Viscosity | (mPa·s) | 3232 | | 2871 | | 4661 | | 3652 | | 2436 | | 1790 | |
| Storage stability evaluation | Thin spots in written line | A | C | A | C | A | C | A | C | A | C | A | C |
| | Concentration difference in written lines | A | A | A | A | A | A | A | A | B | B | B | B |

In the Table, "—" means absence.

TABLE 3

| Production Example | | 25 | 26 | 27 | 28 | 29 | 30 | 31 | 32 | 33 | 34 |
|---|---|---|---|---|---|---|---|---|---|---|---|
| Ink flow pore diameter | (mm) | 0.5 | 0.24 | 0.5 | 0.24 | 0.5 | 0.24 | 0.5 | 0.24 | 0.5 | 0.24 |
| Pigment/water dispersion (parts by mass) | WA-Z COLOR BLACK | 40 | 30 | — | | — | | — | | — | |
| | FUJI SP ORANGE | — | — | | | | | | | | |
| | WA-Z COLOR YELLOWISH GREEN | | | | | | | | | | |
| | WA-Z COLOR BLUE BLACK | | | | | | | | | | |
| | FUJI SP RED | — | — | | | | | | | | |
| | WA-Z COLOR GREEN | — | — | | | | | | | | |
| | BONJET BLACK | — | — | | | | | | | | |
| | FUJI SP BLUE | — | — | | | — | | | | | |
| | LUMKOL NKW-6200E | — | — | | | 35 | | — | | — | |
| Dye/water solution | WATER BK 191-L | | 20 | — | | — | | — | | | |
| | DAIWA BK MR | — | — | | | — | | 50 | | — | |

TABLE 3-continued

| Production Example | | 25 | 26 | 27 | 28 | 29 | 30 | 31 | 32 | 33 | 34 |
|---|---|---|---|---|---|---|---|---|---|---|---|
| (parts by mass) | DAIWA BL 300L | — | — | — | — | — | — | — | — | 50 | — |
| Humectant | Glycerine | — | — | 23 | — | — | — | 10 | 15 | 10 | — |
| (parts by mass) | Ethylene glycol | 10 | — | — | 10 | — | — | 15 | — | — | — |
| | Diethylene glycol | 15 | — | — | 15 | — | — | — | — | — | — |
| | Propylene glycol | — | — | — | — | — | — | — | — | — | — |
| Rust inhibitor (parts by mass) | 5% Benzotriazole solution | 1.5 | | 1.5 | | 1.5 | | — | | — | |
| Preservative (parts by mass) | 10% Benzisothiazolone solution | 0.5 | | 0.5 | | 0.3 | | 1.8 | | 1.8 | |
| Surface active agent (parts by mass) | | 0.9 | | 3.3 | | 0.3 | | 2.5 | | 1.9 | |
| pH Adjuster (parts by mass) | Triethanolamine | 1 | | 0.5 | | — | | 2 | | 2.3 | |
| Gelling agent (parts by mass) | Xanthan gum | 0.42 | | 0.4 | | 0.47 | | 0.45 | | 0.45 | |
| Dispersing assistant (parts by mass) | Fluorine-containing surface active agent | 0.7 | | — | | 0.1 | | — | | — | |
| Storage modulus G' | (Pa) | 5.03 | | 0.93 | | 4.46 | | 0.3 | | 0.43 | |
| Viscosity | (mPa·s) | 4020 | | 3230 | | 4023 | | 1861 | | 1908 | |
| Storage stability evaluation | Thin spots in written line | C | C | A | C | B | C | A | A | A | A |
| | Concentration difference in written lines | A | A | B | B | A | A | A | A | A | A |

In the Table, "—" means absence.

Production Example 35

Six mass parts of carbon black as a pigment (trade name "PRINTEX 25" manufactured by Degussa GmbH), 1.2 mass parts of a dispersing agent (trade name "JONCRYL 61J" manufactured by Johnson Polymer Company), 0.1 mass part of xanthan gum as a gelling agent (trade name "KELZAN HP" manufactured by Sansho Co., Ltd.), 0.2 mass part of crosslinked polyacrylic acid also as a gelling agent (trade name "Hiviswako 105" manufactured by Wako Pure Chemical Industries, Ltd.), 15 mass parts of propylene glycol, 5 mass parts of ethylene glycol, 6 mass parts of a humectant (trade name "Amulty MR-50" manufactured by TOWA KASEI CO., LTD.), 0.5 mass part of a surface active agent (trade name "Phosphanol RS-610" manufactured by TOHO Chemical Industry, Co., Ltd.), 0.1 mass part of a preservative (trade name "Proxel TN" manufactured by Zeneka Company), 0.1 mass part of a rust inhibitor (trade name "Chemitec BT-G" manufactured by CHEMIPRO KASEI KAISHA, LTD.), and 0.3 mass part of triethanolamine as a pH adjuster were mixed and agitated with ion-exchange water to obtain a total of 100 mass parts of an aqueous gel ink.

The storage modulus at 20° C. and the viscosity at 25° C. of this aqueous gel ink were measured similarly to the above Production Example 1, and consequently were 1.29 Pa and 1397 mPa·s, respectively.

Subsequently, the above aqueous gel ink was charged in an ink-storage tube of a ballpoint pen provided with a needle type ballpoint pen tip having an ink flow pore diameter of 0.33 mm to produce an aqueous gel ballpoint pen. By use of the resultant aqueous gel ballpoint pen, thin spots in the written line and concentration difference in the written lines were examined similarly to the above-mentioned evaluations and consequently evaluated as "A" and "B", respectively.

Production Example 36

Six mass parts of phthalocyanine blue as a pigment (manufactured by DAINICHISEIKA COLOUR & CHEMICALS MFG. CO., LTD., C. I. Pigment Blue, trade name "Chromofine Blue 4965"), 1.2 mass parts of a dispersing agent (trade name "JONCRYL 61J" manufactured by Johnson Polymer Company), 0.08 mass part of xanthan gum as a gelling agent (trade name "KELZAN HP" manufactured by Sansho Co., Ltd.), 0.14 mass part of crosslinked polyacrylic acid also as a gelling agent (trade name "Hiviswako 105" manufactured by Wako Pure Chemical Industries, Ltd.), 15 mass parts of propylene glycol, 3 mass parts of a humectant (trade name "PO-300" manufactured by TOWAKASEI CO., LTD.), 0.3 mass part of a surface active agent (trade name "Phosphanol RS-610" manufactured by TOHO Chemical Industry, Co., Ltd.), 0.1 mass part of a preservative (trade name "Proxel TN" manufactured by Zeneka Company), 0.1 mass part of a rust inhibitor (trade name "Chemitec BT-G" manufactured by CHEMIPRO KASEI KAISHA, LTD.), and 0.8 mass part of aminomethyl propanol as a pH adjuster were mixed and agitated with ion-exchange water to obtain in a total of 100 mass parts of an aqueous gel ink.

The storage modulus at 20° C. and the viscosity at 25° C. of this aqueous gel ink were measured similarly to the above Production Example 1, and consequently were 1.04 Pa and 1201 mPa·s, respectively.

Subsequently, the above aqueous gel ink was charged in an ink-storage tube of a ballpoint pen provided with a needle type ballpoint pen tip having an ink flow pore diameter of 0.33 mm to produce an aqueous gel ballpoint pen. By use of the resultant aqueous gel ballpoint pen, thin spots in the written line and concentration difference in the written lines were examined similarly to the above-mentioned evaluations and consequently evaluated as "A" and "B", respectively.

Among Production Examples 1 to 30, 35 and 36 in which an aqueous gel ink containing a pigment as a coloring agent was charged, the Production Examples in which both of the above formulas (1) and (2) were satisfied were evaluated as "A" for concentration difference in the written lines and evaluated as "A" or "B" for thin spots in the written line. In addition, all of Production Examples 31 to 34 in which an aqueous gel ink containing only a dye as a coloring agent was charged satisfied both of the above formulas (3) and (4) and were evaluated as "A" for concentration difference in the written lines and thin spots in the written line.

According to the present invention, there can be provided an aqueous gel ballpoint pen having storage stability of ink sufficiently enhanced particularly when a needle type ballpoint pen tip is adopted, and a method for the production thereof.

What is claimed is:

1. An aqueous gel ballpoint pen comprising an ink-storage tube storing an aqueous gel ink containing a pigment as a coloring agent, and a ballpoint pen tip having a ball rotatably held at its leading end and also having an ink flow pore which is formed so that said aqueous gel ink flows from said ink-storage tube to the ball, wherein an ink flow pore diameter r (unit: mm) in said ballpoint pen tip and a storage modulus G' (unit: Pa) at 20° C. of said aqueous gel ink satisfy conditions represented by the following formulas (1) and (2):

$$0.24 \leq r \leq 0.64 \quad (1), \text{ and}$$

$$1.3 \leq G' \leq 16r - 3.2 \quad (2).$$

2. An aqueous gel ballpoint pen comprising an ink-storage tube storing an aqueous gel ink containing only a dye as a coloring agent, and a ballpoint pen tip having a ball rotatably held at its leading end and also having an ink flow pore which is formed so that said aqueous gel ink flows from said ink-storage tube to the ball, wherein an ink flow pore diameter r (unit: mm) in said ballpoint pen tip and a storage modulus G' (unit: Pa) at 20° C. of said aqueous gel ink satisfy conditions represented by the following formulas (3) and (4):

$$0.24 \leq r \leq 0.64 \quad (3), \text{ and}$$

$$0 < G' \leq 16r - 3.2 \quad (4).$$

3. A method for producing an aqueous gel ballpoint pen comprising an ink-storage tube storing an aqueous gel ink containing a pigment as a coloring agent, and a ballpoint pen tip having a ball rotatably held at its leading end and also having an ink flow pore which is formed so that said aqueous gel ink flows from said ink-storage tube to the ball, wherein the method comprises a step of preparing said aqueous gel ink so that an ink flow pore diameter r (unit: mm) in said ballpoint pen tip and a storage modulus G' (unit: Pa) at 20° C. of said aqueous gel ink satisfy conditions represented by the following formulas (1) and (2):

$$0.24 \leq r \leq 0.64 \quad (1), \text{ and}$$

$$1.3 \leq G' \leq 16r - 3.2 \quad (2).$$

4. A method for producing an aqueous gel ballpoint pen comprising an ink-storage tube storing an aqueous gel ink containing only a dye as a coloring agent, and a ballpoint pen tip having a ball rotatably held at its leading end and also having an ink flow pore which is formed so that said aqueous gel ink flows from said ink-storage tube to the ball, wherein the method comprises a step of preparing said aqueous gel ink so that an ink flow pore diameter r (unit: mm) in said ballpoint pen tip and a storage modulus G' (unit: Pa) at 20° C. of said aqueous gel ink satisfy conditions represented by the following formulas (3) and (4):

$$0.24 \leq r \leq 0.64 \quad (3), \text{ and}$$

$$0 < G' \leq 16r - 3.2 \quad (4).$$

* * * * *